United States Patent [19]
Carpigiani

[11] 3,818,716
[45] June 25, 1974

[54] CONTINUOUS ICE CREAM MACHINE

[76] Inventor: Poerio Carpigiani, Anzola Emilia, Bologna, Italy

[22] Filed: June 25, 1973

[21] Appl. No.: 372,927

[30] Foreign Application Priority Data
July 4, 1972   Italy................................. 12760/72
Nov. 30, 1972   Italy............................... 13045/72

[52] U.S. Cl...................... 62/178, 62/343, 426/519
[51] Int. Cl. ............................................. F25c 7/10
[58] Field of Search ............ 62/342, 343, 178, 188; 426/519

[56] References Cited
UNITED STATES PATENTS
2,870,026   1/1959   Keller et al. ....................... 426/519
2,898,092   8/1959   De Haven Miller et al. ...... 62/342 X

*Primary Examiner*—William E. Wayner
*Attorney, Agent, or Firm*—Larson, Taylor and Hinds

[57] ABSTRACT

A continuous ice cream machine comprises a freezing cylinder, in communication with an adjoining mixing chamber. The dry product component for the ice cream mix is fed in measured amounts by a screw conveyor feeder into the mixing chamber, while the liquid component is also fed into the mixing chamber by a delivery spout of a pipe connected to a suitable source of liquid. The two components are thoroughly and intimately mixed in the mixing chamber by an agitator which comprises beater elements actuated by the rotation of the same shaft of the mixer of the freezing cylinder. A level feeler, which senses the level of the mix in the mixing chamber, automatically controls the actuation of the feeding devices for the dry product and the liquid, and the feeding of said components into the mixing chamber.

7 Claims, 3 Drawing Figures

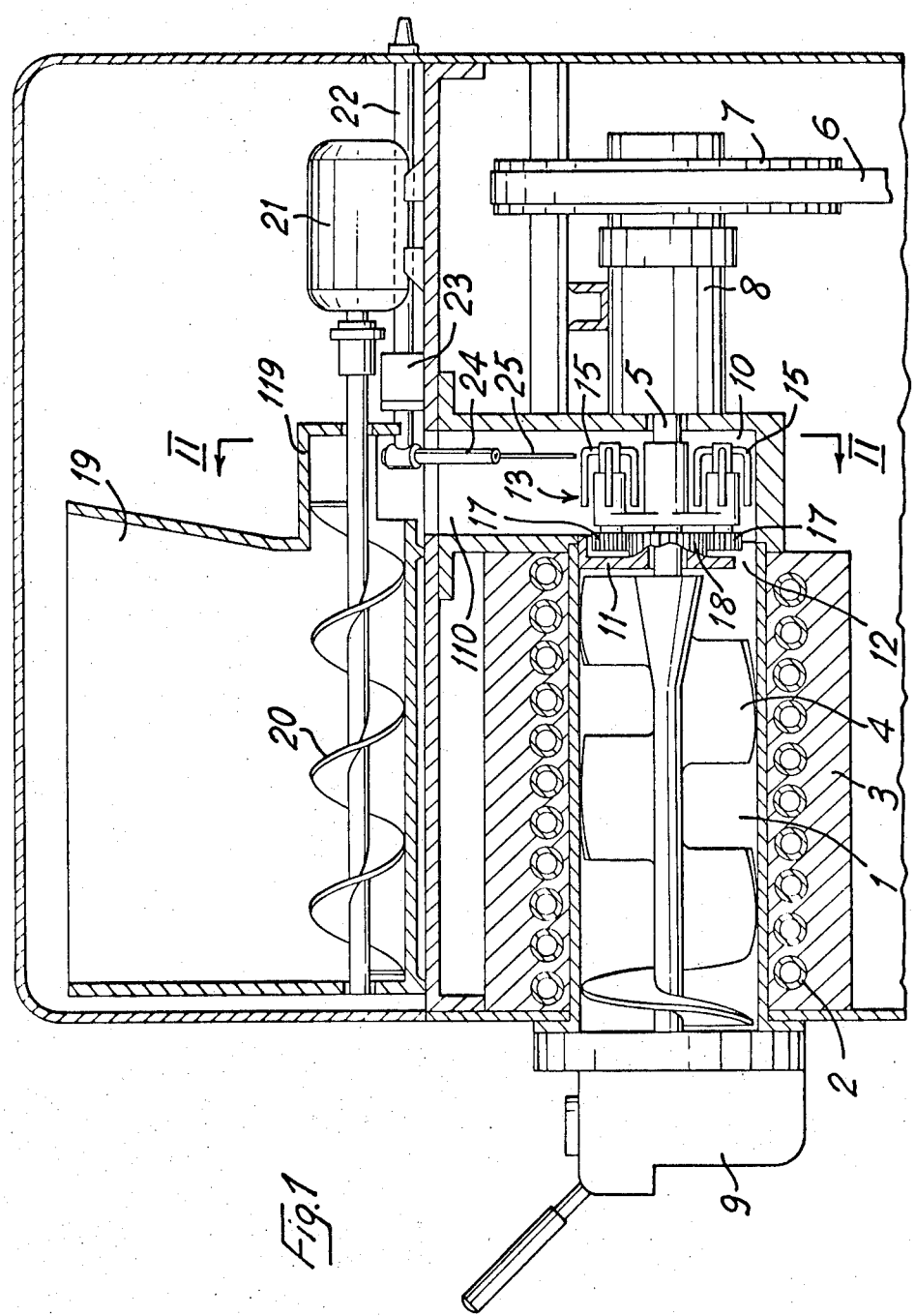

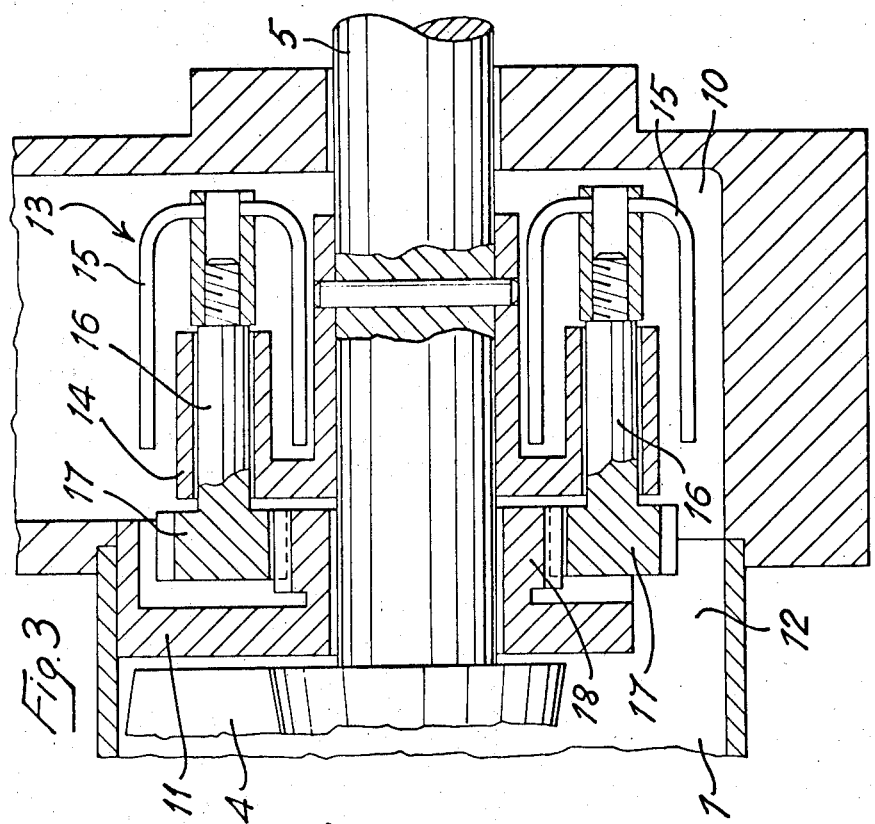
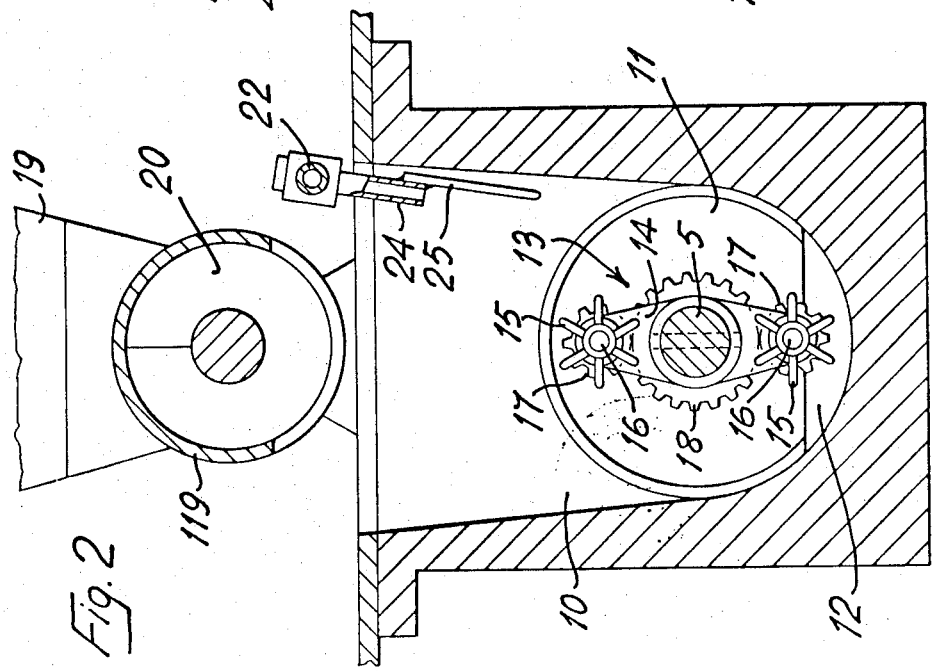

CONTINUOUS ICE CREAM MACHINE

BACKGROUND AND SUMMARY OF THE INVENTION

The present invention relates to continuous ice cream machines of the type comprising a freezing cylinder inside which there rotates a co-axial mixer for forming and forcing the ice cream towards one end of said cylinder, where selectively operable dispensing means are provided for directly dispensing the ice cream to the public. In this type of continuous ice cream machine it is necessary to feed inside the freezing cylinder a liquid ice cream mix, which must be prepared apart, usually by mixing together thoroughly and intimately a dry product, in the form of powder or granulate, and a liquid, usually water.

In the machines known up to the present date this liquid ice cream mix is prepared in batches and poured into a tank which is usually arranged above the freezing cylinder. From this tank the required amounts of mix are drawn off by suitable pump means and fed, whenever requested, into the freezing cylinder. If desired, and particularly in the case of preparation of the so called "soft" ice cream, the pump which feeds the liquid ice cream mix from the tank to the freezing cylinder may present also devices so as to incorporate a certain amount of air into the liquid mix fed to the cylinder.

The above type of machines however present some inconveniences, which may be summarized as follows:

a. From the hygienic point of view, it is necessary to avoid the pollution and in any case the formation of bacteria in the liquid ice cream mix which has been prepared and which is contained in the tank. This problem is usually solved by refrigerating the tank containing the liquid mix, but, besides requiring a more complicated and expensive apparatus, this solution presents the drawback that a good refrigeration of the liquid mix promotes the formation of ice crusts and lumps in the liquid mix, which is very objectionable for the good operation of the machine. Also, particularly in the case of prolonged periods of non use of the machine, the liquid mix in the tank can get spoiled notwithstanding the refrigeration.

b. Also from the hygienic point of view, it is objectionable to have a tank where the liquid mix stands still for some periods of time, with the unavoidable formation of deposits and incrustations (coating) on the walls and bottom of the tank. Of course, these parts are periodically washed and sterilized, but, the greater they are, the more work is required.

c. From the operational point of view it is to be noted that, if in order to avoid the drawbacks of large quantities of mix being prepared and stored into the tank, same is designed to contain a small quantity of mix, it will be necessary to prepare the mix more frequently, particularly in the case of prolonged and continuous use of the machine; if on the contrary, the machine is specifically designed for a prolonged and continuous use, the tank must be constructed having a great capacity, and the overall dimensions of the ice cream machine will be considerably increased, together with the consequent problems of preservations of the prepared liquid mix.

The above and other disadvantages are eliminated by the novel method and apparatus proposed by the present invention, whereby the liquid ice cream mix is formed, in relatively small batches, directly at the moment in which it is required by the freezing cylinder, in a mixing chamber adjoining to and communicating with said freezing cylinder. More particularly, the invention provides for an improved ice cream machine of the type referred to, in which a mixing chamber is provided in communication with the freezing cylinder, and in said mixing chamber there are fed measured amounts of dry ice cream product and of liquid in predetermined proportions, with the further provision, in said mixing chamber, of an agitator element which mixes thoroughly and intimately the said dry product and liquid, so as to form a liquid ice cream mix as required by the freezing cylinder. Advantageously, the invention further provides that the feeding of the liquid ice cream mix components (i.e. the dry product and the liquid) be controlled by a feeler device which is sensible to the level of the mix in the mixing chamber, so that whenever the freezing cylinder requires a new quantity of liquid mix, same is automatically supplied. Further, it is provided that the agitator for the mix is of the beater type, whereby, upon agitating the mix for its preparation, a quantity of air might be incorporated in it, which results most convenient in the case of "soft" ice cream.

Still a further and very important advantage of the invention resides in the fact that the tank for containing the already prepared liquid ice cream mix is abolished, and it is substituted by a container for the dry product (usually in powder or granulate form), while the liquid (which usually is water) can be supplied through a pipe attachment from a source not incorporated in the machine. The above results in a greater production capacity of the machine, since it is evident that the dry product occupies a far smaller space with respect to the quantity of prepared liquid ice cream mix which would be necessary for preparing the same batches of ice cream; on the other hand, the dry product is by far less subject to deterioration, and can be preserved for a long time without any danger from the hygienic point of view.

BRIEF DESCRIPTION OF THE DRAWINGS

The above and other advantages and objects of the present invention will be apparent from the following description of one preferred embodiment of it, made with reference to the accompanying drawings, in which:

FIG. 1 shows diagrammatically, in a longitudinal vertical section with parts in view, the mixing unit of a continuous ice cream machine according to the invention, as enclosed in the upper part of a freezer cabinet;

FIG. 2 is a section taken along the plane of lines II—II of FIG. 1, and

FIG. 3 is a detailed view, in an enlarged scale, showing the agitator device according to the invention with parts in section.

DESCRIPTION OF THE PREFERRED EMBODIMENT

With reference to the drawings, 1 denotes a substantially horizontal freezing cylinder of a continuous ice cream machine particularly adapted for dispensing ice cream directly to the public.

The said freezing cylinder is cooled by a coil 2 fitted all around and embedded in a heat-insulating material 3. Within the freezing cylinder 1 a co-axial mixer 4 having inclined paddles is fastened to a shaft 5. The drive to shaft 5 is imparted, through a coupling 8, by a pulley 7 driven through a belt 6. The front end of said cylinder 1 is closed by a plate 9 preferably made of a non-heat-conductive material, which forms at least the casing of the dispensing tap or faucet.

Adjacent to the rear end of cylinder 1 and coaxially thereto there is provided a mixing chamber 10 which is separated from said cylinder 1 by a substantially vertical partition wall 11. A permanent communication between the cylinder 1 and the mixing chamber 10 is ensured by an opening or port 12 provided in correspondence of the bottom section of said partition wall 11.

In the mixing chamber 10 there is provided an agitator, generically designated by reference numeral 13, which serves to agitate and intimately mix the materials fed into the said mixing chamber, as it will be later explained. Said agitator, in the embodiment as shown comprises (see particularly FIGS. 2 and 3) a supporting member 14 which is keyed to shaft 5 and therefore is integral in rotation with same, said supporting member being provided with two diametrically opposed bushings inside which there are rotatably mounted the shafts 16 carrying at one end two beaters 15 and provided at their opposite end with satellite gears 17 which mesh with a fixed sun gear 18 integral with or anyhow fastened to the partition wall 11.

The mixing chamber 10 is open in its upper section at 110 and communicates freely with the outer atmosphere.

Substantially above the freezing cylinder there is arranged the container 19 for the dry product, in the form of a tank open at the top. Said container 19 presents a discharge outlet or delivery port 119 situated above the mixing chamber and precisely in correspondence of its upper open vertical section 110. The device for feeding measured amounts of dry product from said container to said delivery port 119 comprises a screw feeder 20 arranged in correspondence of the bottom of said container and driven by a suitable electric motor 21.

Into the upper section 110 of the mixing chamber 10 there opens also the delivery spout 24 of a pipe 22 which is connectable to any suitable source of liquid, such as water, for the feeding of the liquid inside the said mixing chamber 10. The feed of liquid is controlled through a suitable electromagnetic valve 23. Attached to the delivery spout 24 and projecting downwardly there is provided a feeler element 25 which senses the variations of the level of the mix in the mixing chamber 10. The feeler element 25 is of any known suitable type and is adapted to control, through suitable electric circuits (not shown) the operation of the motor 21 of the dry product feeder and of the electromagnetic valve of the liquid feeder.

The operation of the just described apparatus is as follows:

Whenever a certain amount of ice cream is dispensed through the dispensing tap 9, in the freezing cylinder 1 there will flow, through the port 12 of the partition 11 a certain amount of mix from the mixing chamber 10. Correspondingly, the level of the mix in said chamber 10 will decrease, and this decrease will be sensed by the level feeler 25 which, whenever a predetermined minimum level has been reached, will promote the starting of the motor 21 and the opening of the electromagnetic valve 23.

Consequently, an amount of dry product will fall from delivery port 119 into chamber 10, while a proportioned amount of liquid will flow from spout 24. It is to be noted that in the shown embodiment the spout is arranged, with respect to the attached feeler 25, so as to wash it from any particles of dry product which may adhere onto it.

When a predetermined level of mix has been reached in the mixing chamber, same will be sensed by feeler 25 which will promote the stopping of motor 21 and the closure of valve 23.

In the meantime, the mix formed in the mixing chamber will be thoroughly agitated by agitator 13. In fact, rotation of shaft 5 will promote a corresponding rotation of the supporting member 14 which carries the satellite gears 17 meshing with the fixed gear 18. As a consequence, the beaters 15, integral in rotation with satellite gears 17 will rotate around their axes 16 and around the axis of shaft 5. It will be appreciated that the beating action of beaters 15 will cause an intimate and perfect dissolution and distempering of the dry product into the liquid, while at the same time a proper adjustment of the level of the mix will enable, during this mixing operation, the incorporation of air in the liquid mix. This particular feature is most advantageous in the case of preparation of the so called soft-ice-cream, i.e. of an ice cream containing a certain amount of air, which preparation, in the case of conventional ice cream machines, requires the use of an air pump to force a determined amount of air in the mix. It is to be noted that the beating of the mix by the agitator is effected whenever shaft 5 rotates, and does not depend therefore from variations of level inside the mixing chamber 10.

It is believed that the invention will have been understood from the foregoing detailed description of a preferred embodiment. Changes in the details of construction may be resorted to without departing from the scope of the invention as set out in the appended claims.

I claim:

1. A continuous ice cream machine of the type comprising a freezing cylinder, a shaft rotatably mounted in said cylinder having inclined paddles for mixing the contents of the cylinder, towards one end of the said freezing cylinder, selectively operable outlet means on said one end for dispensing the contents of the cylinder, said machine further comprising:
   a. a mixing chamber communicating with said freezing cylinder;
   b. a container for an incoherent dry product to be mixed with a liquid in order to form the liquid ice cream mix to be fed inside the freezing cylinder;
   c. control responsive feeding means for feeding said dry product from said container into said mixing chamber;
   d. further control responsive feeding means connectable to a suitable source of liquid for feeding said liquid into said mixing chamber;
   e. an agitator provided in said mixing chamber for mixing the dry product and the liquid fed thereinto.

2. A continuous ice cream machine according to claim 1, wherein both the dry product feeding means and the liquid feeding means are controlled in their operation by a level feeler sensitive to variations of the level of the liquid and dry product mix inside the mixing chamber.

3. A continuous ice cream machine according to claim 1, wherein the mixing chamber is arranged co-axially to the freezing cylinder, adjacent to the other end thereof, and the agitator is mounted co-axially to and driven into operation by a prolongation of the shaft rotatably mounted in the freezing cylinder.

4. A continuous ice cream machine according to claim 3, in which the agitator comprises at least one beater integral in rotation with a satellite gear rotatably mounted on a supporting member which is driven into rotation by the shaft of the freezing cylinder about a fixed gear co-axial to said shaft, said satellite gear meshing with said fixed gear.

5. A continuous ice cream machine according to claim 3, in which the mixing chamber communicates with the freezing chamber through a port provided in correspondence of the lower section of a partition wall between the said freezing cylinder and the said mixing chamber.

6. A continuous ice cream machine according to claim 1, in which the feeding means for the dry product from the container to the mixing chamber comprise a substantially vertical duct opening above said mixing chamber, and screw conveyor means for conveying the dry product from the said container to a delivery port provided in said vertical duct.

7. A continuous ice cream machine according to claim 6 in which the feeding means for the liquid comprise a pipe which opens inside said vertical duct above the mixing chamber, the outlet of said pipe being arranged directly above a level feeler sensitive to variations of the level of the liquid and dry product mix inside the mixing chamber, the flow of liquid in said pipe being controlled through an electromagnetic valve, while the actuation of the screw conveyor means for the dry product is controlled through a suitable electric motor, both the electromagnetic valve and the said electric motor being controlled by the said level feeler.

* * * * *